United States Patent [19]

Okawa et al.

[11] 4,099,108
[45] Jul. 4, 1978

[54] VARIABLE SPEED CONTROL APPARATUS FOR INDUCTION MOTOR

[75] Inventors: Tadashi Okawa; Yasuo Matsuda, both of Hitachi; Hiroshi Hayashida, Tokaimura; Takeo Maeda, Hitachi, all of Japan

[73] Assignee: Hitachi, Ltd., Japan

[21] Appl. No.: 716,205

[22] Filed: Aug. 20, 1976

[30] Foreign Application Priority Data

Sep. 5, 1975 [JP] Japan .................. 50-107007

[51] Int. Cl.² ........................................... H02P 5/40
[52] U.S. Cl. ................................... 318/227; 318/231
[58] Field of Search ..................... 318/227, 230, 231

[56] References Cited

U.S. PATENT DOCUMENTS

| 3,983,463 | 9/1976 | Nabae et al. | 318/227 |
| 4,009,427 | 2/1977 | Takahashi | 318/227 |

Primary Examiner—Herman J. Hohauser
Attorney, Agent, or Firm—Craig & Antonelli

[57] ABSTRACT

An induction motor is operated by a power supply of variable voltage and variable frequency. The voltage and frequency of the variable-voltage variable-frequency power supply is changed by a control circuit to accelerate or decelerate the induction motor. For slowly controlling the speed of the induction motor, the ratio of the output voltage to the output frequency of the variable-voltage variable-frequency power supply is maintained substantially constant. The control circuit includes a voltage correcting means which, in response to a command for sudden acceleration or deceleration of the speed of the motor, corrects the output voltage of the power supply in accordance with the acceleration or deceleration rate and the prevailing magnitude of the output frequency of the variable-voltage variable-frequency power supply.

8 Claims, 13 Drawing Figures

VARIABLE SPEED CONTROL APPARATUS FOR INDUCTION MOTOR

BACKGROUND OF THE INVENTION

1. Field of the Invention

This invention relates to a variable-speed control apparatus for an induction motor, or more in particular to a variable-speed control apparatus suitable for sudden acceleration or deceleration of an induction motor.

2. Description of the Prior Art

It is well known that, in order to effect a variable-speed operation of an induction motor, the induction motor is connected to a variable-voltage variable-frequency power supply and the output voltage and the output frequency of the power supply is changed. In this case, the output voltage and the frequency are changed while maintaining constant the ratio of the voltage V to the frequency f of the motor, i.e., the ratio of the output voltage to the frequency of the power supply (hereinafter which is called the ratio $V/f$). This is for maintaining the torque of the induction motor constant and for preventing magnetic saturation of the core of the induction motor. In the low-frequency range of the output frequency, a control for a constant torque of the induction motor is effected by compensating for a voltage drop due to the impedance of the primary winding of the induction motor. This system may be satisfactorily applied to the case in which the induction motor is not subjected to sudden acceleration or deceleration.

In the case of involving sudden acceleration or deceleration of a large-inertia load by an induction motor such as in driving table rollers of a mill, however, the input current of the induction motor undergoes a change in magnitude ten and several times the normal value, and also the power factor is subjected to a great change from positive to negative. In such a case, keeping the ratio $V/f$ of the induction motor constant is not sufficient for maintaining the torque constant and preventing magnetic saturation of the core of the induction motor. In order to overcome this problem, the ratio of an induced voltage Vm to the frequency f of the induction motor (hereinafter which is called the ratio $Vm/f$) must be kept constant. The conventional control apparatus involving only the constancy of the ratio $V/f$ results in a shortage of torque generation or an overexcitation of the induction motor, thereby leading to a disadvantage of low responsivness to a speed command.

SUMMARY OF THE INVENTION

An object of the present invention is to provide a variable-speed control apparatus for an induction motor, which improves the acceleration and deceleration characteristics of the induction motor.

Another object of the invention is to provide a variable-speed control apparatus for an induction motor, which make the operation of the induction motor highly responsive to an acceleration or deceleration command possible.

A further object of the invention is to provide a variable-speed control apparatus for an induction motor, which prevents an overexcitation of the induction motor at the time of acceleration or deceleration of the motor.

According to the present invention, there is provided a variable-speed control apparatus for an induction motor comprising a variable-voltage variable-frequency power supply for applying to the induction motor power with a substantially constant ratio of the voltage to the frequency, voltage control means for controlling the output voltage of the power supply, frequency control means for controlling the output frequency of the power supply, and command means for applying a speed command signal to the voltage control means and the frequency control means, wherein voltage correction means is provided for correcting the speed command signal applied to the voltage control means from the command means, in accordance with the rate of increase or decrease and the magnitude of the command signal. The voltage correction means include a differentiator circuit for differentiating the speed command signal, a multiplier circuit for multiplying the speed command signal with the output signal of the differentiator circuit and producing the absolute value of the product thereof, and an adder for adding the output signal of the differentiator circuit to the output signal of the multiplier circuit. Furthermore, the apparatus according to the invention includes frequency correction means for correcting the speed command signal applied from the command means to the frequency control means, in accordance with the rate of increase and/or decrease of the speed command signal.

DETAILED DESCRIPTION OF THE PREFERRED EMBODIMENTS

Figure 1:
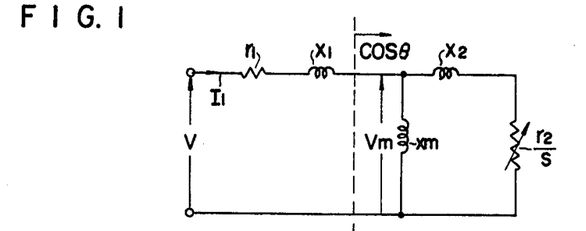
FIG. 1 is a diagram showing an equivalent circuit of an induction motor.
Figure 2:
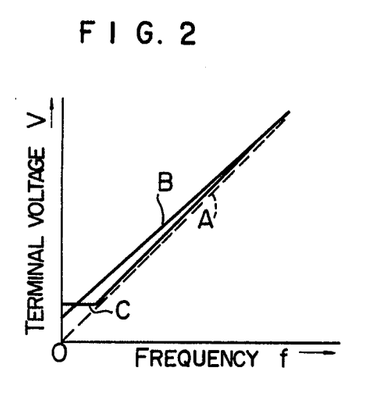
FIG. 2 is a characteristic diagram showing an example of the $V/f$ characteristic of a conventional induction motor.

An equivalent circuit of an induction motor is shown in FIG. 1. Reference character $r_1$ shows the resistance of the primary winding of the induction motor, character $r_2$ the resistance of the secondary winding, character $x_1$ the primary leakage reactance, character $x_2$ the secondary leakage reactance, character $x_m$ the excitation reactance, character $s$ the slip, character V the terminal voltage, character $V_m$ the induced voltage, character $I_1$ the motor current, and the symbol $\cos\theta$ the power factor as viewed toward the secondary side from the excitation part excluding $r_1$ and $x_1$. As seen from the diagram of FIG. 1, the voltage drop $I_1(r_1 + jx_1)$ is caused by the impedance of the primary winding and therefore, if the ratio $Vm/f$ is to be kept constant, it is necessary to correct the ratio $V/f$ by $I_1(r_1 + jx_1)$. In a conventional control apparatus, the straight line B or C in FIG. 2 is introduced in order to control the speed of the motor for correction with reference to the straight line A involving a constant ratio $V/f$. However, such a fixed amount of correction is not satisfactory when a large change in the primary current occurs, for example, in the case of sudden acceleration or deceleration of a heavy load with great inertia.

Figure 3:
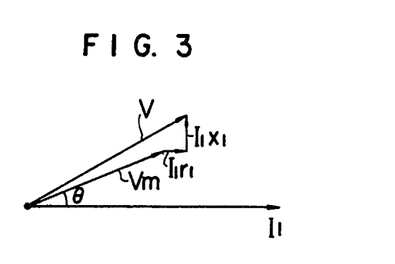
FIG. 3 is a vector diagram showing the voltages and the current of the induction motor shown in FIG. 1.

FIG. 3 shows a vector diagram of the voltages and current in the induction motor on the basis of the equivalent circuit of FIG. 1. From this vector diagram, the relation between the voltages and current is obtained as shown in equation (1).

$$V = \sqrt{Vm^2 + I_1^2(r_1^2 + x_1^2) + 2VmI_1(r_1\cos\theta + x_1\sin\theta)} \quad (1)$$

Assuming that $K = Vm/f$ and $x_1 = 2\pi l_1 f$ ($l_1$: the inductance of the primary winding), the following relations are substituted into the equation (1).

$$a = K^2 + 2KI_1\cdot(2\pi l_1)\sin\theta + I_1^2(2\pi l_1)^2$$

$$b = 2KI_1 r_1 \cos\theta$$

$$c = I_1^2 r_1^2$$

Then the equation (1) is rewritten to the following equation (2).

$$V^2 = af^2 + bf + c \quad (2)$$

The equation (2) represents a hyperbola, the asymptote of which is given by equation (3) below.

$$V = \sqrt{a}\,(f + (b/2a)) \quad (3)$$

Figure 4:
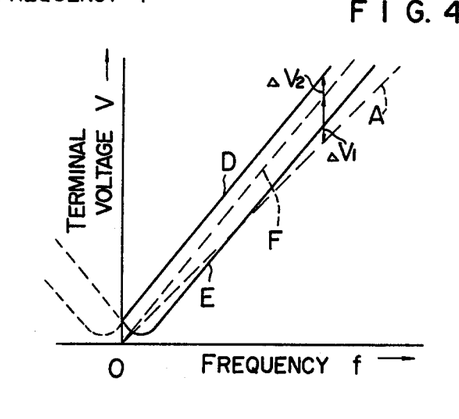
FIG. 4 is a characteristic diagram showing the $V/f$ characteristic of an induction motor according to the invention.

A graphic presentation of the equation (2) is shown in FIG. 4. The curve D shows the case in which the sign of $\cos\theta$ is positive, and the curve E the case in which the sign of $\cos\theta$ is negative with the same absolute value. The straight line F represents an intermediate between the asymptotes of curves D and E and is expressed by equation (4).

$$V = \sqrt{a}\,f \quad (4)$$

A frequency corresponding to the minimum value on the curve E is several Hz in a general-purpose induction motor. When an induction motor is used at frequencies higher than several Hz, the curves D and E may be approximately substituted by straight lines almost parallel thereto and represented by equation (3).

Next, it will be seen from the following description that $\Delta V_1$ in FIG. 4 is substantially proportional to the current $I_1$ and the frequency f and that $\Delta V_2$ is substantially proportional to the current $I_1$. It will be understood from FIG. 4 that $\Delta V_1$ is calculated as follows.

$$\Delta V_1 = \sqrt{a}\,f - Kf =$$

$$\left\{ \sqrt{1 + 2\frac{1}{K}\,2\pi l_1 \sin\theta\, I_1 + \left(\frac{2\pi l_1 I_1}{K}\right)^2} - 1 \right\} Kf$$

In an ordinary induction motor, $$\left(\frac{2\pi f l_1 I_1}{Kf}\right)^2 << 1$$

and therefore $$\Delta V_1 \approx 2\pi l_1 f \sin\theta \cdot I_1 = K_1 I_1 \cdot f$$

Also, $\Delta V_2$ is calculated as follows.

$$\Delta V_2 = \frac{b}{2\sqrt{a}} =$$

$$\frac{I_1 r_1 \cos\theta}{\sqrt{1 + 2\frac{1}{K}\cdot 2\pi l_1 \sin\theta\, I_1 + \left(\frac{2\pi l_1 I_1}{K}\right)^2}}$$

In an ordinary induction motor, $$\frac{1}{K}\cdot 2\pi l_1 I_1 \sin\theta << 1,$$

$$\left(\frac{2\pi l_1 I_1}{K}\right)^2 << 1$$

and therefore, $$\Delta V_2 \doteq I_1 r_1 \cos\theta = K_2 I_1$$

A change in current $I_1$ is substantially proportional to a change in the rate of acceleration or deceleration in the range of slip smaller than a slip causing the maximum torque. Thus, $\Delta V_1$ is proportional to both the acceleration or deceleration rate and frequency, while $\Delta V_2$ is substantially proportional to the acceleration or deceleration rate. Accordingly, a value proportional to the acceleration or deceleration rate is multiplied by a value proportional to the frequency to obtain the value of $\Delta V_1$, while the value of $\Delta V_2$ is obtained from a value proportional to the acceleration or deceleration rate. By adding the value represented by the straight line A and the values of $\Delta V_1$ and $\Delta V_2$ to each other, it is substantially possible to obtain the characteristic curve D. By subtracting the value of $\Delta V_2$ from the sum of the value shown by the straight line A and the value of $\Delta V_1$, on the other hand, the characteristic curve E is substantially obtained. More approximate values may be obtained if a no-load current component is added for correction.

Figure 5:
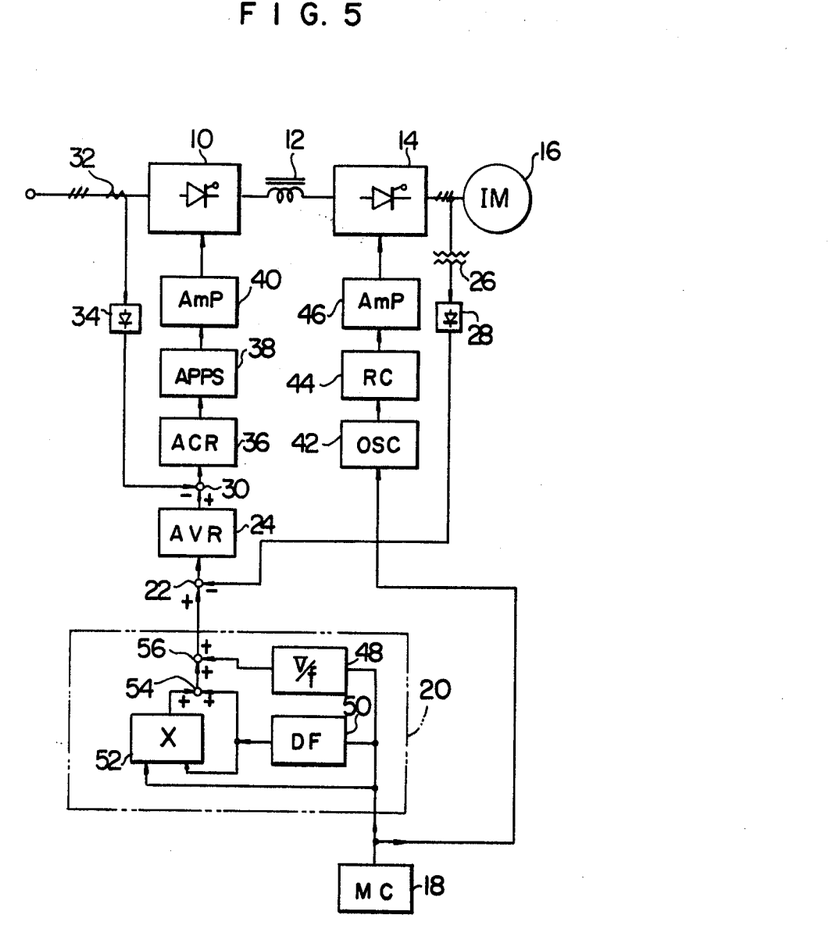
FIG. 5 is a circuit diagram showing a variable-speed control apparatus for an induction motor according to an embodiment of the present invention.

A circuit diagram of a variable-speed control apparatus for an induction motor according to an embodiment of the present invention is shown in FIG. 5. In FIG. 5, three-phase AC power is applied to a converter 10, and a current converted into a DC current by the converter 10 is applied through a DC reactor 12 to an inverter 14. Three-phase AC power generated by the inverter 14 is applied to an induction motor 16 thereby to supply power thereto. The converter 10 and the inverter 14 make up a variable-voltage variable-frequency power supply. The output voltage of the converter 10 is controlled by a voltage control circuit. A command signal from a speed command generator 18 is applied to a V/f regulator 20 for converting the input command signal into a command signal for realizing a predetermined value of the output voltage of the converter 10. The output signal from the V/f regulator 20 is applied via an adder 22 to an automatic voltage regulator 24. The output voltage of the inverter 14 is fed back to the adder 22 through a transformer 26 and a rectifier 28. In other words, the difference between the output signal of the V/f regulator 20 and the fed-back portion of the output signal of the inverter 14 is applied to the automatic voltage regulator 24. The output signal of the automatic voltage regulator 24 is applied to an adder 30. A signal representing the difference between this signal applied to the adder 30 and a fed-back signal detected by a current transformer 32 and rectified into direct current by a rectifier 34 is applied to an automatic current regulator 36. The output signal of the automatic current regulator 36 operates an automatic pulse shifter 38, the output of which is amplified by an amplifier 40 and applied to the converter 10, so that the firing of each of thyristors (not shown) included in the converter 10 is controlled thereby to control the output voltage of the converter 10.

The output frequency of the inverter 14 is controlled by a frequency control circuit. The command signal from the command generator 18 is applied to a variable frequency oscillator 42 thereby to regulate the oscillation frequency thereof. The oscillation signal from the variable-frequency oscillator 42 is divided in frequency by a ring counter 44 and, via an amplifier 46, applied to thyristors (not shown) of the inverter 14, thereby controlling the output frequency thereof.

The V/f regulator 20 includes a V/f setter 48 for setting the ratio V/f at the time of the steady operation of the motor, a differentiator 50 for differentiating the command signal, a multiplier 52 for multiplying the command signal with the output signal of the differentiator 50, an adder 54 for adding the output signal of the differentiator 50 and the output signal of the multiplier 52, and another adder 56 for adding the output signal of the adder 54 to the output signal of the V/f setter 48.

Figure 6:
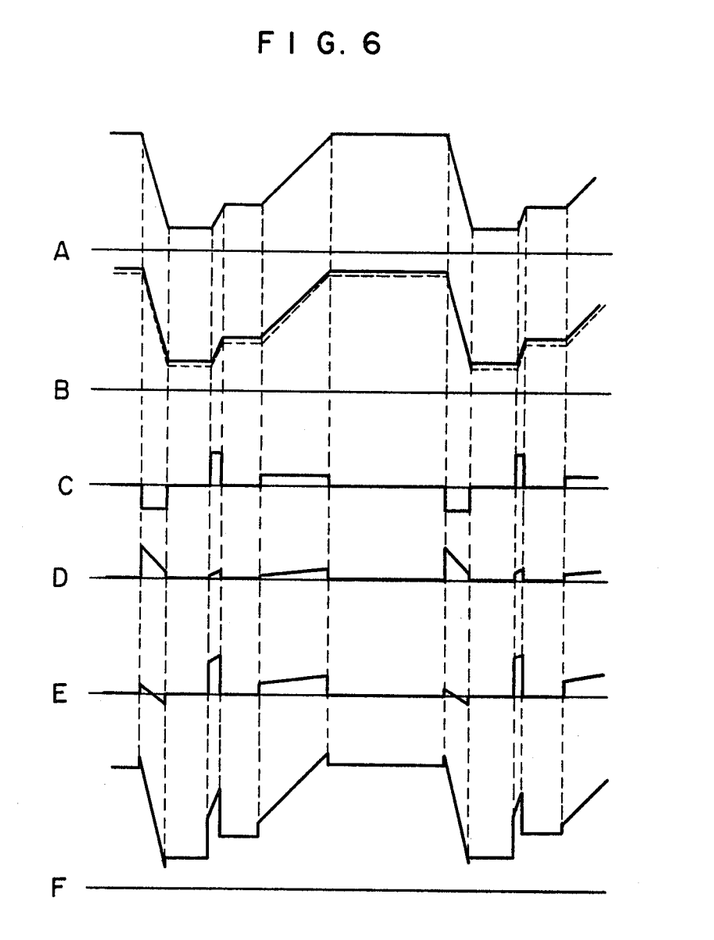
FIG. 6 shows waveforms for explaining the operation of a $V/f$ regulator shown in FIG. 5.

The operation of the V/f regulator 20 will be explained with reference to waveforms shown in FIG. 6. FIG. 6A shows a command signal, i.e., an output of the speed command generator 18, representing, for example, a speed pattern of the roller table of a mill. In FIG. 6B, the solid line represents an output signal of the V/f setter 48, i.e., an output signal of V/f regulator 20 in the case of the steady operation of the motor, while the dotted line represents the command signal shown in FIG. 6A, and the difference between the dotted line and the solid line represents the amount of voltage correction for the steady operation of the motor. FIG. 6C shows an output signal of the differentiator 50 which is derived by differentiating the command signal A, which output signal is proportional to the rate of speed increase or decrease of the induction motor. Outputs of opposite polarities are produced by the differentiator 50 in acceleration and deceleration, respectively. FIG. 6D shows an output signal of the multiplier 52 which is obtained as a result of multiplication of the command signal A and the output signal C of the differentiator 50. The multiplier 52 is so constructed that the output thereof assumes an absolute value. FIG. 6E shows a signal obtained by adding the output signal C of the differentiator 50 to the output signal D of the multiplier 52 by means of the adder 54. FIG. 6F shows a signal obtained by adding the output signal A of the V/f setter 48 to the output signal E of the adder 54 by means of the adder 56. The thus obtained signal F makes up an output signal of the V/f regulator 20.

According to this configuration, the output voltage of the converter 10 is regulated as an appropriate output signal is produced by the V/f regulator 20 at the time of an increase or a decrease in the command signal. As a result, the induction motor is operated efficiently and caused to faithfully follow the command.

Figure 7:
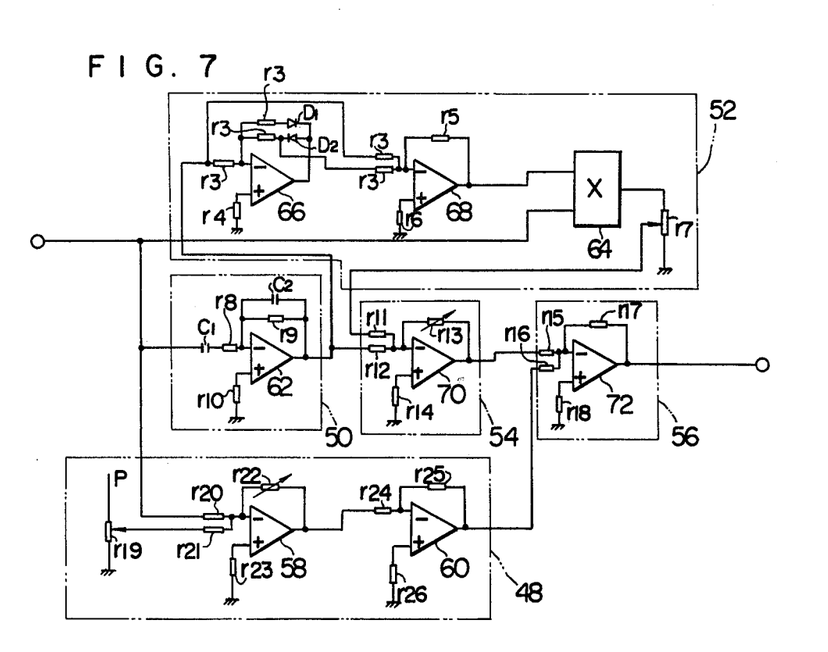
FIG. 7 is a circuit diagram showing a specific construction of the $V/f$ regulator shown in FIG. 5.

A specific construction of the V/f regulator 20 is shown in FIG. 7. In this Figure, component elements corresponding to those in FIG. 5 are denoted by the same reference numerals. The V/f setter 48 is comprised of operational amplifiers 58 and 60; the differentiator 50 is comprised of an operational amplifier 62; the multiplier 52 is comprised of a multiplier 64 and a couple of operational amplifiers 66 and 68 for producing the absolute value of the output signal from the differentiator 50; and the adders 54 and 56 are comprised of an operational amplifier 70 and an operational amplifier 72 respectively. Resistors $r_3$ to $r_{26}$, capacitors $C_1$ and $C_2$, and diodes $D_1$ and $D_2$ are also inserted. Character P shows a power supply. In this embodiment, the absolute value of the output signal of the differentiator 50 is predetermined, which output signal is multiplied by the command signal by the multiplier 64.

Figure 8:
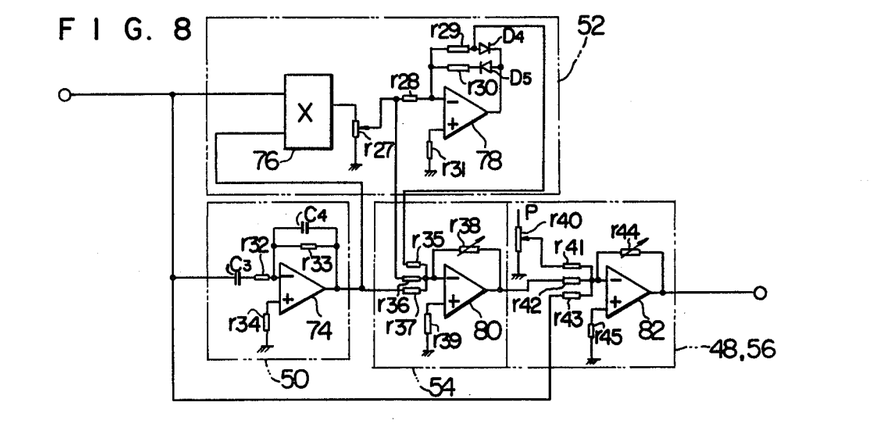
FIG. 8 is a circuit diagram showing another specific construction of the $V/f$ regulator shown in FIG. 5.

Another specific construction of the V/f regulator 20 is shown in FIG. 8. In this embodiment, the differentiator 50 is comprised of an operational amplifier 74, while the multiplier 52 is comprised of a multiplier 76 and an operational amplifier 78 for applying the absolute value of an output of the multiplier 76 to the adder 54. The adder 54 is comprised of an operational amplifier 80. In this embodiment, the operational amplifier 82 operates both as the V/f setter 48 and the adder 56. Characters $r_{27}$ to $r_{45}$ show resistors, characters $C_3$ and $C_4$ capacitors, and $D_4$ and $D_5$ diodes.

Figure 9:
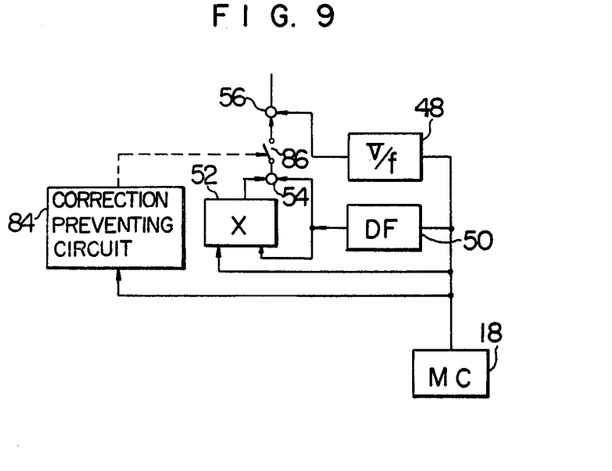
FIG. 9 is a block diagram showing another $V/f$ regulator according to another embodiment of the invention.

Another V/f regulator is shown in FIG. 9. In this V/f regulator, a correction preventing circuit 84 is provided for preventing a correction command from being applied to the adder 56 when the command signal is of a predetermined value. This correction preventing circuit 84 operates so that, when the command signal is for deceleration, a switch circuit 86 is actuated thereby to cut off the correction signal which otherwise might be applied from the adder 54 to the adder 56. This is to prevent deterioration in the responsiveness of the induction motor which would be caused by a time delay in the control system and a resulting insufficient deceleration torque if the correction signal is applied in a low frequency range at the time of deceleration.

Figure 10:
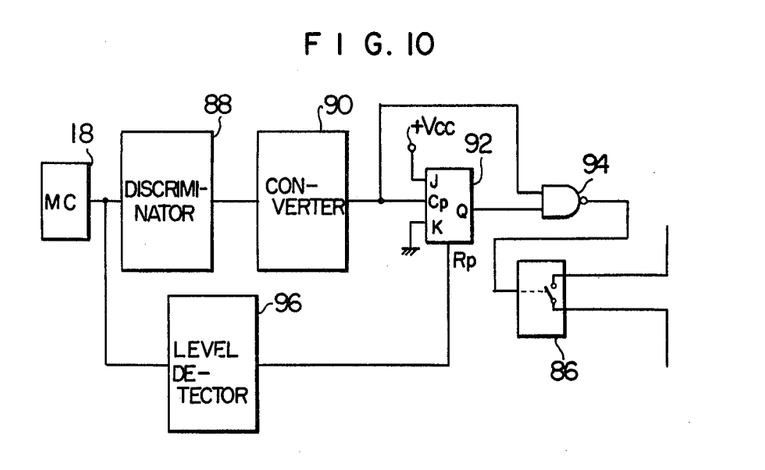
FIG. 10 is a block diagram showing a construction of a correction preventing circuit in FIG. 9.

A construction of the correction preventing circuit 84 is shown in FIG. 10. In this Figure, reference numeral 88 shows a discriminator for effecting discrimination between increase and decrease of the command signal from the speed command generator 18, numeral 90 a converter circuit for producing a positive output signal in response to a negative portion of the output signal from the discriminator 88, numeral 92 a JK flip-flop impressed with the output signal of the converter circuit 90, numeral 94 a NAND circuit to which the output signals from the JK flip-flop 92 and the converter circuit 90 are applied, and numeral 96 a level detector for detecting the level of the command signal.

The output signal of the level detector 96 is applied to the terminal $R_p$ of the JK flip-flop 92.

Figure 11:
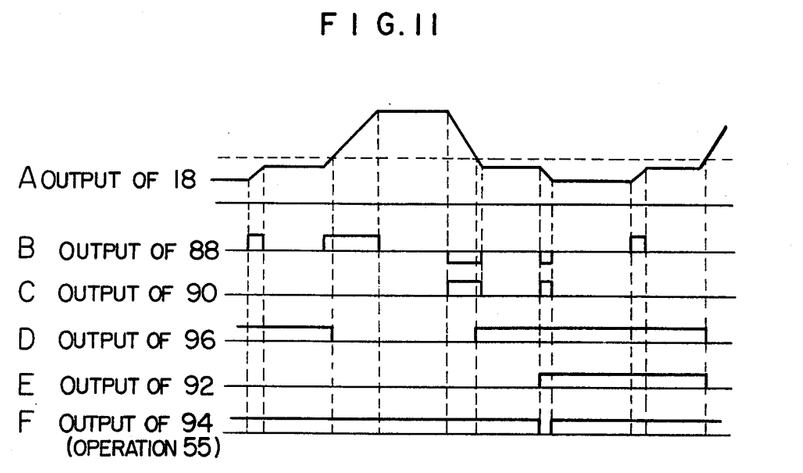
FIG. 11 shows waveforms for explaining the operation of the circuit of FIG. 10.

The operation of this circuit will be explained with reference to FIG. 11. FIG. 11A shows the command signal produced from the speed command generator 18. As shown in FIG. 11B, an output of the discriminator 88 assumes the state of "+1" when the command signal is increased (acceleration), "0" when it is steady, and "−1" when it is decreased (deceleration). The converter circuit 90, in response to the output signal from the discriminator 88, produces a "1" output signal only in response to the "−1" state of the output signal of the discriminator 88 as shown in FIG. 11 C. The level detector 96 produces a "1" signal as shown in FIG. 11C only when the level of the command signal, i.e., the output frequency of the inverter 14 is lower than a predetermined level. The output signal of the converter circuit 90 is applied as a clock signal, and the signal of the level detector 96 as a reset signal, to the JK flip-flop 92. As a result, the output of the JK flip-flop 92 assumes the form of a "1" signal as shown in FIG. 11E when the command signal is decreased (deceleration) below the set level (set frequency). The NAND circuit 94, as shown in FIG. 11F, produces an output for switching off the switch 86 when the command signal takes the form of a deceleration signal under the set level. Although this correction preventing circuit 84 is so constructed that no correction command signal is delivered for deceleration under a predetermined frequency, correction may alternatively be totally eliminated for deceleration.

Figure 12:
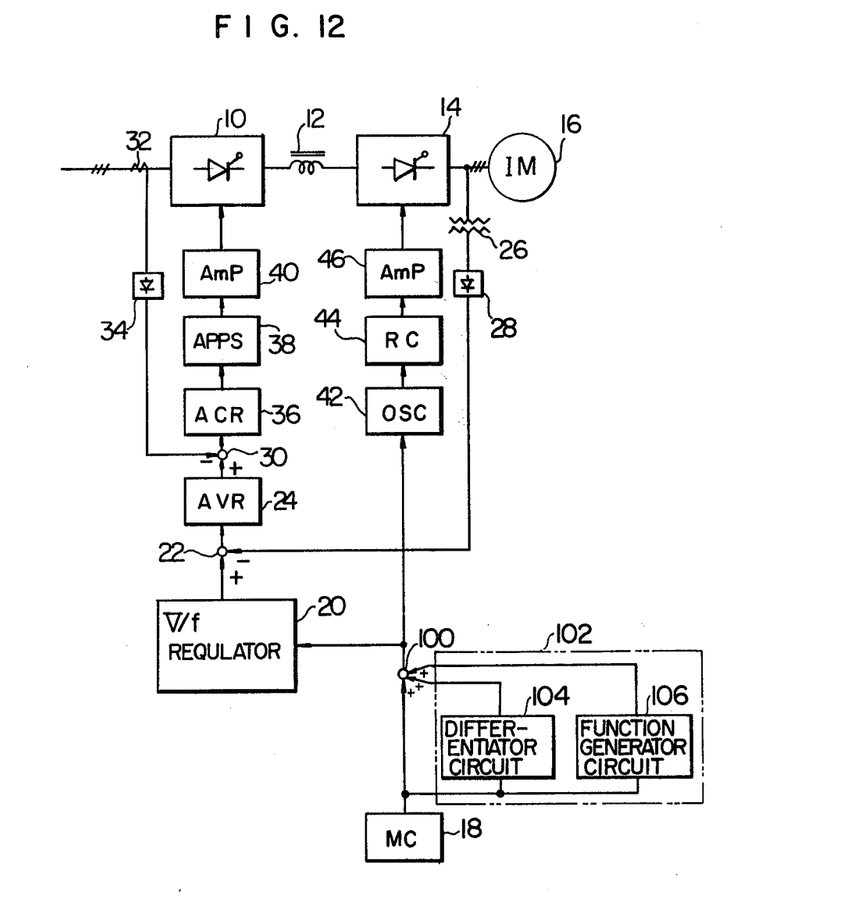
FIG. 12 is a circuit diagram showing a variable-speed control apparatus for an induction motor according to still another embodiment of the invention.

A variable-speed control apparatus according to another embodiment of the invention is shown in FIG. 12. In this embodiment, the command signal from the speed command generator 18 is applied to the adder 100 directly on the one hand and to the same adder 100 via a frequency correction circuit 102 on the other, for correction of the speed command signal. The remaining parts are similar to those in FIG. 5 and descriptions are omitted with respect thereto. The frequency correction circuit 102 is comprised of a differentiator circuit 104 and a function generator circuit 106. In the frequency correction circuit 102, a correction command associated with the rate of increase or decrease, as the case may be, of the command signal is produced from the differentiator circuit 104 while a correction signal proportional to the command signal is produced from the function generator circuit 106.

Figure 13:
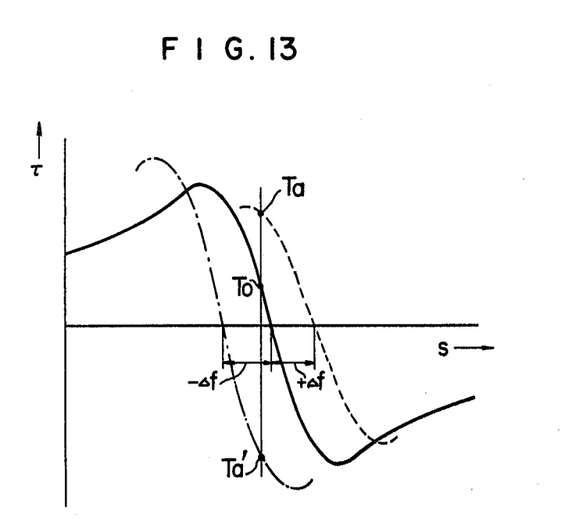
FIG. 13 is a diagram showing the slip-torque characteristic of an induction motor controlled by the control apparatus shown in FIG. 12.

The slip(S)-torque($\tau$) characteristic of an induction motor controlled by the control apparatus shown in FIG. 12 is shown in FIG. 13. When the induction motor is operating along the solid curve, the correction is effected by $+\Delta f$ in the case of acceleration thereby to increase the torque generation in the induction motor from To to Ta, and by $-\Delta f$ in the case of deceleration thereby to generate a negative torque Ta' in the induction motor. In the embodiment of FIG. 12, when an acceleration is desired, the amount of correction of the frequency is increased in accordance with the acceleration rate. When a large acceleration is involved, a corresponding larger torque is required in order for the induction motor to successfully respond to the associated acceleration command. This problem is solved by increasing the amount of frequency correction in proportion to the acceleration rate. The function generator 106 is provided for correcting a mechanical loss of the induction motor which is proportional to the frequency. In the case where the mechanical loss is not greatly increased in proportion to the frequency, the function generator 106 may be omitted. By changing the frequency slightly in accordance with the rate of increase or decrease in the command signal as in the embodiment of FIG. 12, it is possible for the induction motor to respond more sensitively to the command signal.

We claim:

1. In a variable-speed control apparatus for an induction motor, comprising variable-voltage variable-frequency power supply means for applying to the induction motor electric power with a substantially fixed ratio between the voltage and the frequency, voltage control means for controlling the output voltage of said power supply means, frequency control means for controlling the output frequency of said power supply means, and command means for applying a speed command signal to said voltage control means and said frequency control means; the improvement comprising voltage correction means for correcting said speed command signal applied from said command means to said voltage control means in accordance with a rate of change in said speed command signal corresponding to a rate of acceleration or deceleration of the speed of the induction motor and the magnitude of said speed command signal.

2. A variable-speed control apparatus for an induction motor according to claim 1, in which said voltage correction means includes a differentiator circuit for differentiating said speed command signal, a multiplier circuit for multiplying an output signal of said differentiator circuit with said speed command signal and producing the absolute value of a result of said multiplication, and an adder for adding the output of said differentiator circuit to the output of said multiplier circuit.

3. A variable-speed control apparatus for an induction motor according to claim 2, in which said multiplier circuit includes an absolute value producing circuit for producing the absolute value of the output of said differentiator circuit, and a multiplier for multiplying the output of said absolute value producing circuit with the command signal.

4. A variable-speed control apparatus for an induction motor according to claim 2, in which said multiplier circuit includes a multiplier for multiplying the output of said differentiator circuit with the command signal and an absolute value producing circuit for producing the absolute value of an output of said multiplier.

5. A variable-speed control apparatus for an induction motor according to claim 1, in which said voltage correction means corrects the command signal only when a change in the speed command signal corresponding to an acceleration of the induction motor is detected.

6. A variable-speed control apparatus for an induction motor according to claim 1, in which said voltage correction means corrects the speed command signal only when a change in the speed command signal corresponding to an acceleration of the induction motor or a change in the speed command signal corresponding to a deceleration of the induction motor in a state such that the speed command signal is larger than a predetermined level is detected.

7. In a variable-speed control apparatus for an induction motor, comprising variable-voltage variable-frequency power supply means for applying to the induction motor electric power with the substantially fixed ratio between voltage and frequency, voltage control means for controlling the output voltage of said power supply means, frequency control means for controlling the output frequency of said power supply means, and command means for applying a speed command signal to said voltage control means and said frequency control means; the improvement comprising voltage correction means for correcting said speed command signal applied from said command means to said voltage control means in accordance with a rate of change in said speed command signal corresponding to a rate of acceleration or deceleration of the speed of the induction motor and the magnitude of said command signal, and frequency correction means for correcting the speed command signal applied from said command means to said frequency control means in accordance with the rate of change in said speed command signal corresponding to the rate of acceleration or deceleration of the speed of the induction motor.

8. A variable-speed control apparatus for an induction motor according to claim 7, in which the speed command signal corrected by said frequency correction means is applied to said voltage control means and said voltage correction means.

* * * * *